(12) United States Patent
Jeon et al.

(10) Patent No.: US 11,945,407 B2
(45) Date of Patent: Apr. 2, 2024

(54) NON-WOVEN FABRIC FOR A VEHICLE INTERIOR MATERIAL, MANUFACTURING METHOD OF THE SAME AND CARGO SCREEN FOR A VEHICLE USING THE NON-WOVEN FABRIC FOR A VEHICLE INTERIOR MATERIAL

(71) Applicants: Hyundai Motor Company, Seoul (KR); Kia Corporation, Seoul (KR); Korea Vilene Co., Ltd., Pyeongtaek-si (KR)

(72) Inventors: Hongchan Jeon, Suwon-si (KR); Myoung Ryoul Lee, Suwon-si (KR); Wonjong Lee, Suwon-si (KR); Se Young Jung, Pyeongtaek-si (KR); Eun Kyung Kim, Anseong-si (KR); Yong Kgil Jung, Pyeongtaek-si (KR)

(73) Assignees: Hyundai Motor Company, Seoul (KR); Kia Corporation, Seoul (KR); KOREA VILENE CO., LTD., Pyeongtaek-si (KR)

( * ) Notice: Subject to any disclaimer, the term of this patent is extended or adjusted under 35 U.S.C. 154(b) by 0 days.

(21) Appl. No.: 17/870,473

(22) Filed: Jul. 21, 2022

(65) Prior Publication Data
US 2022/0355740 A1   Nov. 10, 2022

Related U.S. Application Data

(62) Division of application No. 15/903,687, filed on Feb. 23, 2018, now Pat. No. 11,427,130.

(30) Foreign Application Priority Data

Mar. 22, 2017 (KR) .................. 10-2017-0035962

(51) Int. Cl.
*B60R 5/04* (2006.01)
*B32B 5/02* (2006.01)
(Continued)

(52) U.S. Cl.
CPC .............. *B60R 5/047* (2013.01); *B32B 5/022* (2013.01); *B32B 27/12* (2013.01); *B32B 27/30* (2013.01);
(Continued)

(58) Field of Classification Search
CPC ......... B32B 5/022; B32B 27/12; B32B 27/30; B32B 33/00; B32B 38/06
(Continued)

(56) References Cited

U.S. PATENT DOCUMENTS 5,584,523 A * 12/1996 Kawaguchi ............ B60R 5/047
296/37.16
2005/0249931 A1   11/2005 Utsumi

FOREIGN PATENT DOCUMENTS

KR    10-1999-0039952 A    6/1999
KR       20-0370190 Y1    12/2004
(Continued)

OTHER PUBLICATIONS

Machine translation of KR-1019990039952 (Year: 1999).

*Primary Examiner* — Vincent Tatesure
(74) *Attorney, Agent, or Firm* — MORGAN, LEWIS & BOCKIUS LLP

(57) ABSTRACT

Disclosed is non-woven fabric for a vehicle internal material, a manufacturing method of the non-woven fabric, and a cargo screen for a vehicle using the non-woven fabric for a vehicle internal material, wherein the manufacturing method of non-woven fabric for a vehicle internal material is configured to includes forming a felt by mixing LM PET (Low melting polyethylene terephthalate) staple fibers hav- (Continued)

ing a melting point in the range of 120 to 140° C. and 150 to 170° C. and PET staple fibers; and thermo-compression molding the felt.

3 Claims, 7 Drawing Sheets

(51) Int. Cl.
  *B32B 27/12* (2006.01)
  *B32B 27/30* (2006.01)
  *B32B 33/00* (2006.01)
  *B32B 38/06* (2006.01)
(52) U.S. Cl.
  CPC .............. *B32B 33/00* (2013.01); *B32B 38/06* (2013.01); *B32B 2307/3065* (2013.01); *B32B 2367/00* (2013.01)
(58) Field of Classification Search
  USPC ........................................................ 442/414
  See application file for complete search history.

(56) References Cited

FOREIGN PATENT DOCUMENTS

| | | |
|---|---|---|
| KR | 10-0729957 B1 | 6/2007 |
| KR | 10-0983809 B1 | 9/2010 |
| KR | 10-1270668 B1 | 6/2013 |

\* cited by examiner

NON-WOVEN FABRIC FOR A VEHICLE INTERIOR MATERIAL, MANUFACTURING METHOD OF THE SAME AND CARGO SCREEN FOR A VEHICLE USING THE NON-WOVEN FABRIC FOR A VEHICLE INTERIOR MATERIAL

CROSS-REFERENCE(S) TO RELATED APPLICATIONS

The present application is a Divisional of U.S. patent application Ser. No. 15/903,687, filed Feb. 23, 2018, which claims priority to Korean Patent Application No. 10-2017-0035962, filed on Mar. 22, 2017, the entire contents of which is incorporated herein for all purposes by this reference.

BACKGROUND OF THE INVENTION

Field of the Invention

The present invention relates to a non-woven fabric for a vehicle internal material, a manufacturing method of the non-woven fabric, and a cargo screen for a vehicle using the non-woven fabric for a vehicle internal material.

Description of Related Art

Non-woven fabrics are fabrics made in a way that various fibers including natural, chemical, glass, and metal form webs, and the webs are combined to each other by physical or chemical methods. Non-woven fabrics are being used in a wider range of applications due to the recent development of the chemical industry and the mass production of high-performance products at low cost.

In the fields related to vehicle internal materials (door trim, vehicle headliner, seat, etc.) among the fields where nonwoven fabrics are used, the internal materials of polyvinyl chloride (PVC), which is poor in design and texture, have been steadily replaced by internal materials having various functionalities.

Furthermore, research and development on nonwoven fabrics are continuously being conducted to realize a soft and luxurious design like leather.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a non-woven fabric for vehicle internal material manufactured by needle punching a web formed by mixing polyethylene terephthalate (PET) staple fibers and LM PET staple fibers, a manufacturing method of the non-woven fabric and a cargo screen using the non-woven fabric for vehicle internal material.

Various aspects of the present invention are directed to providing a non-woven fabric for vehicle internal material manufactured by performing a thermo-compression molding process to improve a thickness variation caused by a needle punching process, and performing an emboss pattern forming process on one side of the non-woven fabric to improve the appearance quality of the non-woven fabric, a manufacturing method of the non-woven fabric and a cargo screen using the non-woven fabric for vehicle internal material.

Various aspects of the present invention are directed to providing a manufacturing method of non-woven fabric for vehicle internal material. The method includes forming a felt by mixing LM PET(Low melting polyethylene terephthalate) staple fibers having a melting point in the range of 120 to 140 and 150 to 170° C. and PET staple fibers; and performing thermo-compression molding the felt.

The formation of the felt may include forming the felt by mixing LM PET staple fibers in an amount of 15 to 25 wt % based on the total fiber weight and PET staple fibers in an amount of 75 to 85 wt % based on the total fiber weight.

The formation of the felt may include forming a web by mixing the LM PET staple fibers and the PET staple fibers; and forming the felt by needle-punching the web.

The method may further include forming an emboss pattern on one side of the felt.

The method may further include performing a binder coating step by impregnating one side of the felt with a phosphorous flame retardant and an acrylic binder.

The method may further include coating acrylic polymer on one side of the felt.

Another aspect of present invention provides a non-woven fabric for vehicle internal material manufactured by thermo-compression molding of a felt, wherein the felt is formed by mixing polyethylene terephthalate (PET) staple fibers and LM PET staple fibers having a melting point in the range of 120 to 140 and 150 to 170° C.

The felt may be formed by mixing LM PET staple fibers in an amount of 15 to 25 wt % based on the total fiber weight and PET staple fibers in an amount of 75 to 85 wt % based on the total fiber weight.

The felt may have an emboss pattern on one side of the felt.

The felt may have a binder coating layer formed of a phosphorous flame retardant and an acrylic binder on one side of the felt.

The felt may have a printing layer formed of an acrylic polymer on one side of the felt.

Various aspects of the present invention are directed to providing a cargo screen for vehicle. The cargo screen includes a housing having both end portions supported by a vehicle body and having a slit hole formed at one side of the housing; a winding roller rotatably provided in the housing and elastically supported to rotate in a direction opposite to the slit hole; and a non-woven fabric wound around the winding roller to be drawn out to the outside by an external force, wherein the non-woven fabric is manufactured by thermo-compression molding of a felt formed by mixing polyethylene terephthalate (PET) staple fibers and LM PET staple fibers having a melting point in the range of 120 to 140 and 150 to 170° C.

The non-woven fabric may be formed by mixing LM PET staple fibers in an amount of 15 to 25 wt % based on the total fiber weight and PET staple fibers in an amount of 75 to 85 wt % based on the total fiber weight.

The non-woven fabric may have an emboss pattern on one side of the non-woven fabric.

The non-woven fabric may have a binder coating layer formed of a phosphorous flame retardant and an acrylic binder on one side of the non-woven fabric.

The non-woven fabric may have a printing layer formed of an acrylic polymer on one side of the non-woven fabric.

The methods and apparatuses of the present invention have other features and advantages which will be apparent from or are set forth in more detail in the accompanying

Figure 1:
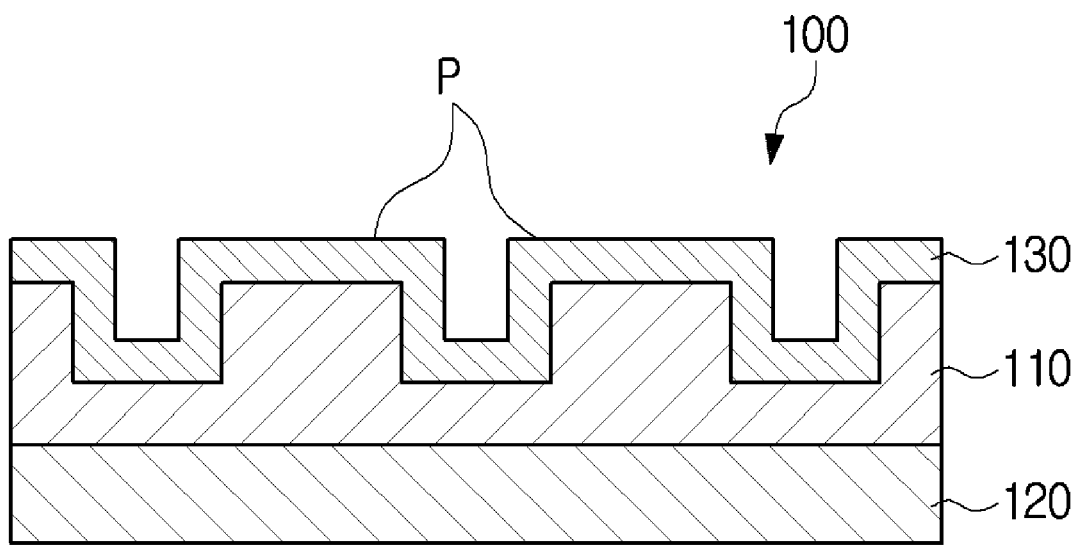
FIG. 1 is a diagram illustrating a structure of a non-woven fabric for a vehicle internal material according to an exemplary embodiment of the present invention.

It should be known that the appended drawings are not necessarily to scale, presenting a somewhat simplified representation of various features illustration of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and may not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements may not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for describing embodiments only and is not intended to be limiting. As used herein, the singular forms "a," "an," and "the," are intended to include the plural forms as well, unless the context clearly indicates otherwise.

Reference will now be made in detail to the exemplary embodiments of the present invention, examples of which are illustrated in the accompanying drawings, wherein like reference numerals refer to like elements throughout.

FIG. 1 is a diagram illustrating a structure of a non-woven fabric 100 for vehicle internal material according to an embodiment.

As illustrated in FIG. 1, a non-woven fabric 100 for vehicle internal material according to the embodiment is provided with a felt 110 formed by mixing PET(Polyethylene terephthalate) staple fibers and LM PET(Low Melting Polyethylene terephthalate) staple fibers having a melting point in the range of 120 to 140 and 150 to 170° C.

The felt 110 is formed by mixing LM PET staple fiber and PET staple fiber, manufactured by forming a web by mixing the LM PET staple fiber and PET staple fiber, and needle-punching the web.

The PET staple fiber may include PET staple fibers having a melting points in the range of about 250 to 270° C., preferably a melting points of about 260° C.

The LM PET staple fiber is a low melting point PET staple fiber having a melting point lower than that of a general staple fiber. The LM PET staple fiber may include a PET staple fiber having a melting point in the range of 120 to 140° C. and a PET staple fiber having a melting point in the range of 150 to 170° C. For example, LM PET staple fibers having a melting point of 130° C. may be used, LM PET staple fibers having a melting point of 160° C. may be used, or LM PET staple fibers mixed therewith may be used.

The LM PET staple fibers contained in the fiber may present in an amount of 15 to 25% by weight, based on the total weight of the fiber. When the content of the LM PET staple fibers is less than 15 wt %, the content of the PET staple fibers becomes relatively high, and thus the appearance quality including deterioration of sharpness and deflection of the emboss pattern may be deteriorated while the flexibility and heat resistance of the non-woven fabric 100 are only excellent. Additionally, as the vehicle internal material the non-woven fabric 100 may have a difficulty in the durability.

On the contrary, when the content of the LM PET staple fibers is more than 25 wt %, the content of the LM PET stable fiber becomes relatively high, and thus the characteristic of the heat aging resistance and humidity aging resistance are weak. Therefore, the fiber is not suitable for the vehicle internal material. Additionally, in the heat press process, the occurrence of hardening due to melting of LM PET staple fibers is widely performed, and thus the flexibility of the nonwoven fabric 100 deteriorates, which may cause wrinkles to remarkably degrade the appearance quality.

Next, the PET staple fibers contained in the fiber may present in an amount of 75 to 85% by weight, based on the total weight of the fiber. When the content of the PET staple fiber is less than 75 wt %, the content of the LM PET staple fiber is increased, and as described above, it is not suitable to be used as the vehicle internal material because of its poor heat aging resistance and humidity aging resistance characteristics.

On the contrary, when the content of the PET staple fiber is more than 85 wt %, the content of the PET staple fiber becomes relatively high, and thus the appearance quality including deterioration of sharpness and deflection of the emboss pattern may be deteriorated while the flexibility and heat resistance of the non-woven fabric 100 are only excellent. Additionally, as the vehicle internal material the non-woven fabric 100 may have a difficulty in the durability.

Accordingly, it is necessary to appropriately adjust the content ratio of the LM PET staple fiber and the PET staple fiber according to the physical properties of the product to be implemented.

The thickness of the LM PET staple fiber and the PET staple fiber may be appropriately selected in consideration of processability and appearance quality. The LM PET staple fiber and the PET staple fiber may preferably have the thickness in the range of 1 to 6 denier. When the thickness of the fiber is less than 1 denier, the processability in manufacturing the non-woven fabric may be lowered because the thickness of the fiber is too thin. On the contrary, when the thickness of the fiber is higher than 6 denier, the feel and appearance quality of non-woven fabric 100 may deteriorate because the thickness of the fiber is too thick. Therefore, it is preferable to appropriately adjust the thickness of the fibers.

An emboss pattern P may be formed on one surface of the felt 110. The emboss pattern P may be formed by pressing the flat felt 110 with an embossing die, and the emboss pattern P may be formed along the shape of the embossing die. Here, the embossing die may be formed on one surface of a pressure roller provided in a non-woven fabric manufacturing apparatus. Further, the emboss pattern P may be formed in a regular or irregular shape, and may be formed in a regular pattern or an irregular pattern according to the embodiment.

The emboss pattern P formed on one side of the felt 110 imparts an embossing effect to the non-woven fabric 100, and thus the appearance quality of the felt 110 may be improved. In addition, when the non-woven fabric 100 is applied to a cargo screen of the vehicle, due to the emboss pattern P, there is an effect of reducing noise generated by friction between edge portions of a slit hole of a cargo screen housing and the non-woven fabric 100.

A binder coating layer 120 may be formed on one surface of the felt 110 to provide flame retardancy and dimensional stability to the felt 110. The binder coating layer 120 may be formed by impregnating a phosphorus-based flame retardant and an acrylic binder by a foam coating method, but the constituent components and the forming method of the binder coating layer 120 are not limited to the examples described above.

The emboss pattern P may be formed on one side of the binder coating layer 120 and the emboss pattern P may have the same shape as the emboss pattern P formed on one side of the felt 110.

A printing layer 130 may be formed on the other surface of the felt 110 to improve the wear resistance of the felt 110 and to ensure a function of preventing contamination. The printing layer 130 may include an acryl-based polymer component, but the constituent components of the printing layer 130 are not limited to the examples described above.

The non-woven fabric 100 described above may be applicable to parts for vehicle internal materials including door trim and seat. As an example, the non-woven fabric 100 may be applicable to a cargo screen for the vehicle. For the convenience of explanation, an example in which the above-described nonwoven fabric 100 is applied to a cargo screen of the vehicle will be described, and a method of manufacturing the non-woven fabric 100 for vehicle internal material according to an exemplary embodiment of the present invention will be described in detail.

Figure 2:
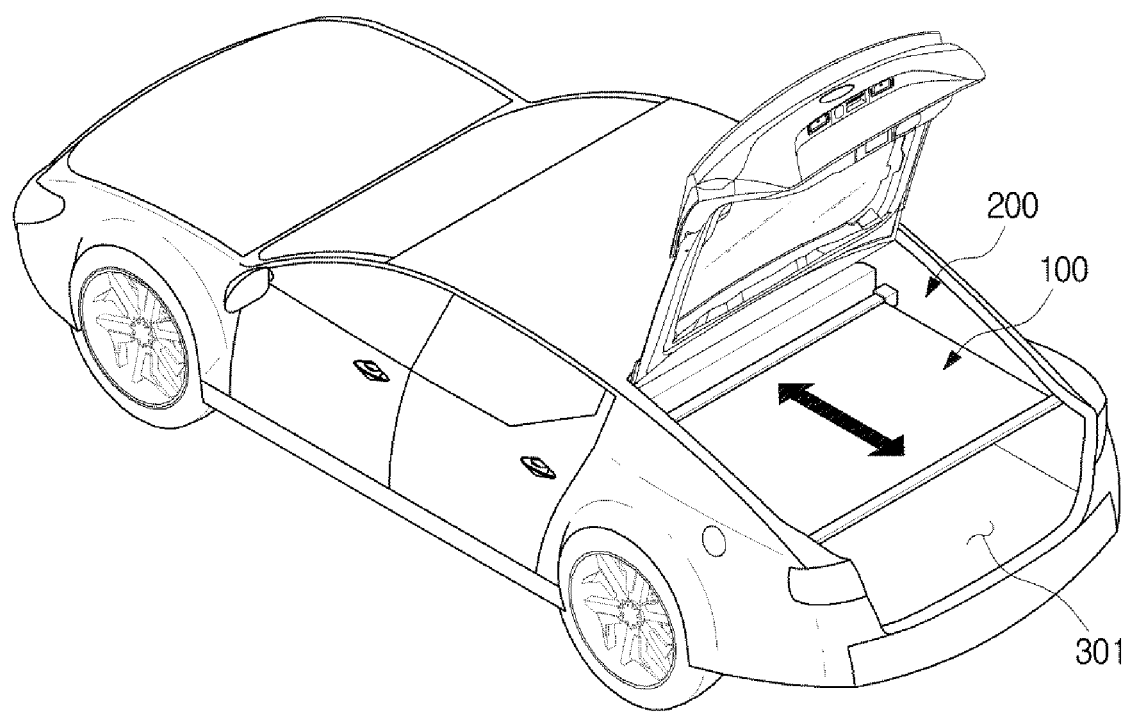
FIG. 2 is a view showing a state in which a cargo screen for a vehicle according to an exemplary embodiment of the present invention is disposed inside a vehicle.
Figure 3:
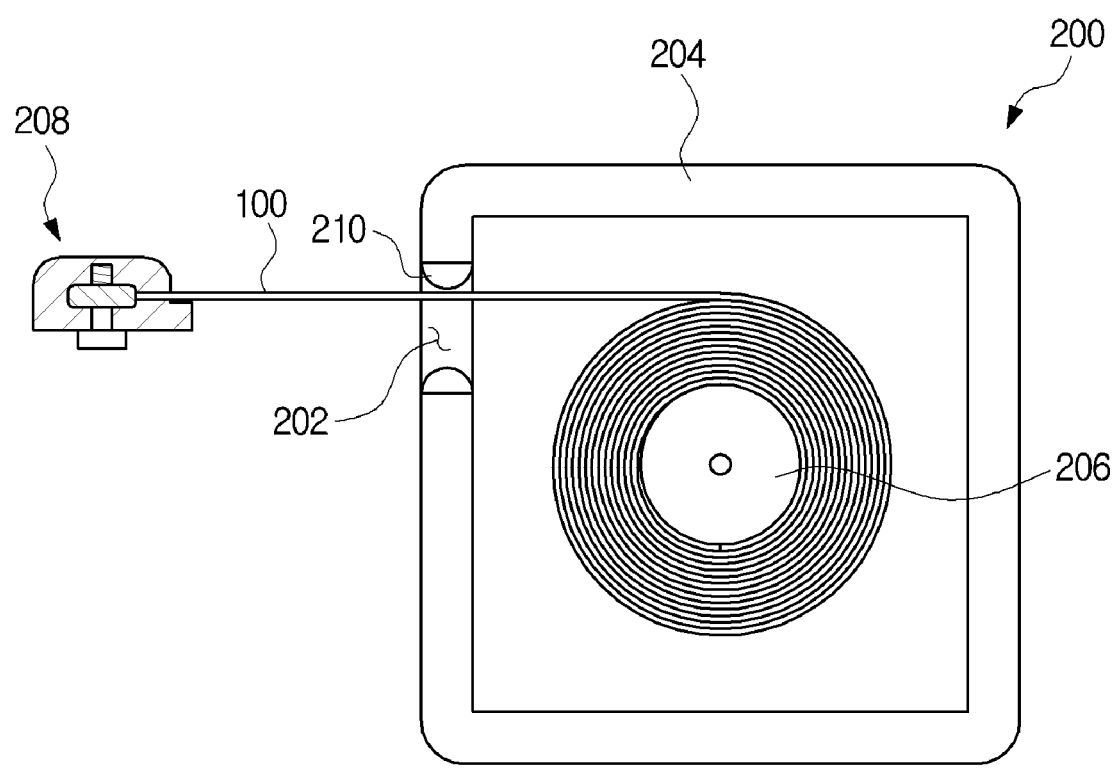
FIG. 3 is a view showing a structure of a cargo screen for a vehicle according to an exemplary embodiment of the present invention.

FIG. 2 is a view showing a state in which a cargo screen 200 for vehicle according to an exemplary embodiment is disposed inside a vehicle, and FIG. 3 is a view showing a structure of the cargo screen 200 for vehicle according to an embodiment.

As illustrated in FIG. 2 and FIG. 3, the cargo screen 200 is disposed in a screen guide groove formed in a luggage side trim of the vehicle, and the cargo screen 200 is configured to open or close a luggage compartment 301 to cover various items stored in the luggage compartment 301.

The cargo screen 200 includes a housing 204 having opposite end portions supported by a vehicle body and having a slit hole 202 formed at one side of the housing 204, a winding roller 206 rotatably provided in the housing 204 and elastically supported to rotate in a direction opposite to the slit hole 202, and a non-woven fabric 100 wound around the winding roller 206 to be drawn out to the outside by an external force. As the non-woven fabric 100, the non-woven fabric 100 having the structure described above with reference to FIG. 1 may be applied, and a description of the same parts as those shown in the above description will be omitted.

In addition, the cargo screen 200 may include a holder 208 provided at an end portion of the non-woven fabric 100 to facilitate gripping the non-woven fabric 100 and to prevent the non-woven fabric 100 from being drawn into the housing 204.

On the other hand, a noise reduction device 210 for reducing the friction noise generated when pulling-out of the non-woven fabric 100, may be formed on the upper and lower end portions of the slit hole 202. The noise reducing device 210 may be made of a soft brush member or a PTFE (Polytetrafluoroethylene) based on fluoro-resin. The noise reducing device 210 may be provided with a sliding member having a round machined surface formed on one surface of the sliding member to reduce noise generated when the noise reducing device 210 is in contact with the non-woven fabric 100.

Hereinbefore the structure of the non-woven fabric 100 for vehicle and the cargo screen 200 formed of the non-woven fabric 100 for vehicle according to an exemplary embodiment of the present invention has been described. The technical idea of the present invention is not limited to the above-described embodiment, and the non-woven fabric 100 for vehicle may be applicable to other automotive internal parts other than cargo screen 200 for vehicle.

Hereinafter a method for manufacturing such a non-woven fabric 100 for vehicle will be described in detail.

Figure 4:
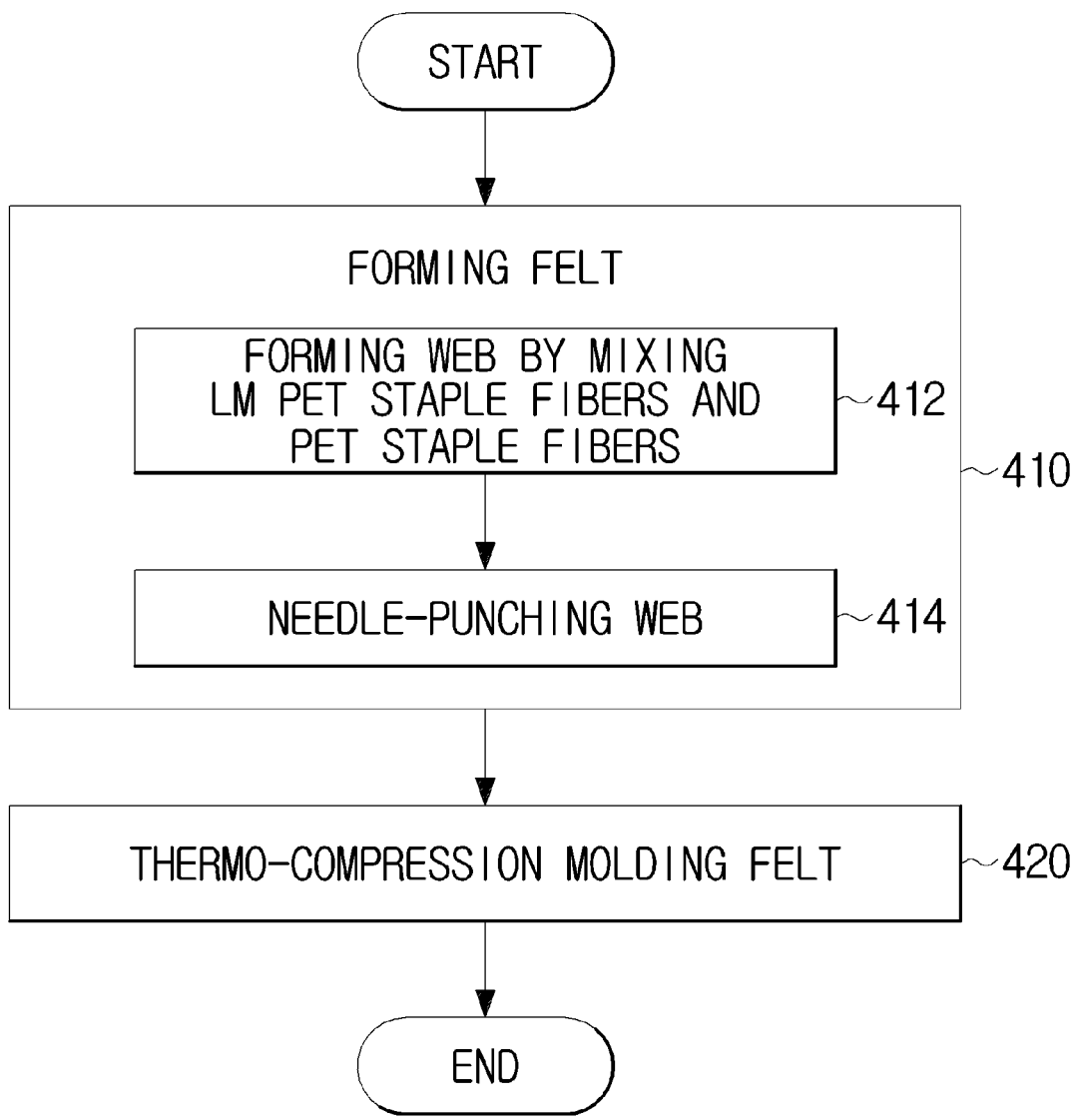
FIG. 4 is a flowchart of a manufacturing method of a non-woven fabric for a vehicle internal material according to an exemplary embodiment of the present invention.

FIG. 4 is a flowchart of a manufacturing method of a non-woven fabric 100 for vehicle internal material according to an embodiment.

As illustrated in FIG. 4, a manufacturing method of non-woven fabric for vehicle internal material may include forming a felt by mixing LM PET staple fibers and PET staple fibers (410) and thermo-compression molding the felt (420).

Forming a felt by mixing the LM PET staple fibers and the PET staple fibers includes forming a web by mixing the LM PET staple fibers having a melting point in the range of 120 to 140 and 150 to 170° C. and the PET staple fibers (412), and forming the felt by needle-punching the web (414). The needle punching process is a process for forming irregular tangles in a web structure in which the LM PET staple fibers and the PET staple fibers are cross-laminated.

The LM PET staple fibers and the PET staple fibers may be mixed such that 15 to 25 wt % of the LM PET staple fibers based on the total fiber weight and 75 to 85 wt % of the PET staple fibers, based on the total fiber weight are mixed. The description of the same parts as those shown in the above description with respect to the numerical limitations will be omitted, and the experimental example related to the basis of the numerical limitation will be described in detail in the description of the experimental example described later (410).

Next, a step of thermo-compression molding of the felt may be performed. When the web is formed by the needle punching, the thickness of the felt may vary due to the needle punching. The step of thermo-compression-molding of the felt may be performed to reduce the thickness variation of the felt. The non-woven fabric according to an exemplary embodiment of the present invention is manufactured through a nonwoven fabric manufacturing apparatus. The nonwoven fabric manufacturing apparatus may include a heating roller and a rubber roller for the thermo-compression molding of the nonwoven fabric. Accordingly, the felt is thermo-compression-molded by the heating roller and the rubber roller of the nonwoven fabric manufacturing apparatus, resulting in a uniform thickness.

Meanwhile, the step of thermo-compression molding of the felt may include a step of forming an emboss pattern on one surface of the felt. When the felt is thermo-compression molded, the felt is passed between the heating roller and the rubber roller as described above. At this time, an emboss pattern to be embodied in the felt may be formed on one surface of the rubber roller. In the present case, the emboss patterns are formed on one surface of the felt as the felt passes between the heating roller and the rubber roller (420).

Meanwhile, the method for manufacturing the non-woven fabric for vehicle internal materials may include additional processes for supplementing the physical properties of the felt according to the embodiment. Hereinafter, additional processes that may be selectively performed will be described.

Figure 5:
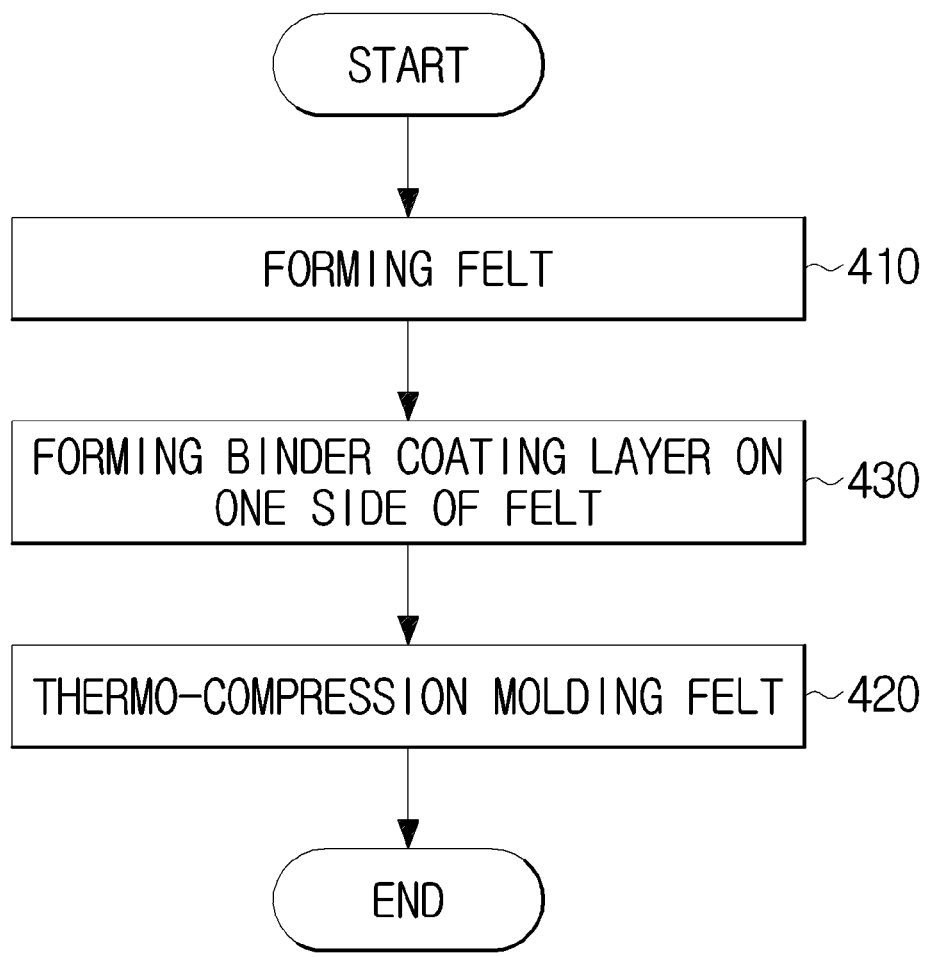
FIG. 5 is a flowchart of a manufacturing method of a non-woven fabric for a vehicle internal material according to another exemplary embodiment of the present invention.
Figure 6:
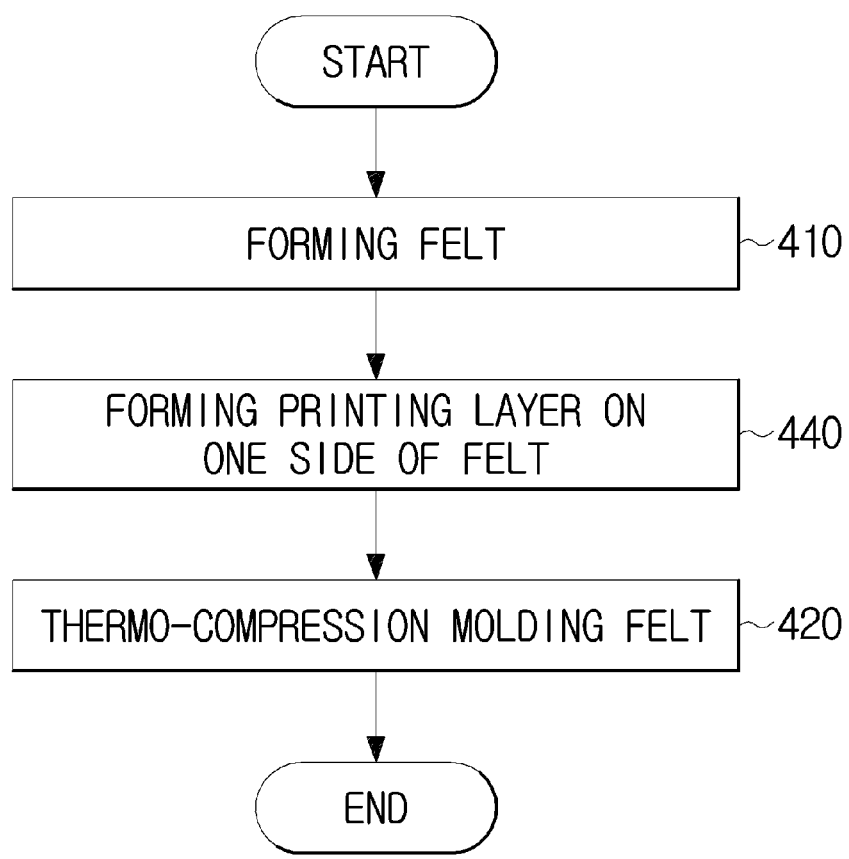
FIG. 6 is a flowchart of a manufacturing method of a non-woven fabric for a vehicle internal material according to another exemplary embodiment of the present invention.

FIG. 5 is a flowchart of a manufacturing method of a non-woven fabric for a vehicle internal material according to another exemplary embodiment, and FIG. 6 is a flowchart of a manufacturing method of a non-woven fabric for vehicle internal material according to another exemplary embodiment.

As illustrated in FIG. 5, the manufacturing process of the non-woven fabric for a vehicle internal material according to another exemplary embodiment may further include a step of forming a binder coating layer on one side of the felt (430).

The step of forming the binder coating layer 430 may be performed between the step of forming the felt 410 and the step of thermo-compression molding the felt 420.

The step of forming the binder coating layer may include a step of impregnating one side of the felt with a phosphorus flame retardant and an acrylic binder in a foam coating method. Such a binder coating layer may impart flame retardancy and shape stability to the felt.

As illustrated in FIG. 6, the manufacturing process of the non-woven fabric for a vehicle internal material according to another exemplary embodiment may further include a step of forming a printing layer by coating an acrylic polymer on the other surface of the felt (440). Here, the other surface of the felt refers to an opposite surface to one surface of the felt having the binder coating layer described above with reference to FIG. 5.

The step of coating the acrylic polymer 440 may be performed between the step of forming the felt 410 and the step of thermo-compression molding the felt 420.

The step of forming the printing layer may include a step of coating an acrylic polymer on the other side of the felt, and the printing layer may impart the abrasion resistance and the antifouling function to the felt.

Hereinbefore, the manufacturing process of the non-woven fabric for vehicle internal material has been described. The manufacturing process of the non-woven fabric for vehicle internal material may include the step of forming the binder coating layer and the step of forming the printing layer as described above, and both processes may be included according to the embodiment.

Next, to facilitate understanding, the melting point and the limitation of the weight ratio of the LM PET staple fibers and the PET staple fibers used in the manufacturing process of the non-woven fabric for vehicle internal materials according to an exemplary embodiment of the present invention will be described in detail with reference to experimental data.

To carry out the physical property measurement experiment, webs were formed by mixing the LM PET staple fibers and the PET staple fibers having the melting point and content ratios shown in [Table 1] and [Table 2] for each of the examples and comparative examples, the web were needle-punched to form felt, and the felt was thermo-compression molded to produce a physical specimen. In the present case, the felt is thermo-compression molded through the heating roller and the rubber roller, and an amorphous emboss pattern is formed on one side of the felt to improve the appearance quality of the felt and reduce noise generation during friction.

The melting point and content ratio of the component of the physical specimens according to [Example 1] to [Example 6] and [Comparative Example 1] to [Comparative Example 9] are as follows.

EXAMPLE 1

Felt was formed by mixing 85 wt % of PET staple fibers having a melting point of 260° C. based on the total fiber weight and 15 wt % of LM PET staple fibers having a melting point of 130° C. based on the total fiber weight, and the felt was subjected to the thermo-compression molding to produce physical specimens. Here, the PET staple fiber and the LM PET staple fiber each have a fiber having a 3d thickness.

EXAMPLE 2

Except that 80 wt % of PET staple fibers based on the total fiber weight and 20 wt % of LM PET staple fibers based on the total fiber weight were mixed with each other to form a felt, it is the same as the manufacturing process of the physical specimen according to [Example 1]

EXAMPLE 3

Except that 75 wt % of PET staple fibers based on the total fiber weight and 25 wt % of LM PET staple fibers based on the total fiber weight were mixed with each other to form a felt, it is the same as the manufacturing process of the physical specimen according to [Example 1]

EXAMPLE 4

Except that the felt was formed using PET staple fibers and LM PET staple fibers having a melting point of 160° C., it is the same as the manufacturing process of the physical specimen according to [Example 1].

EXAMPLE 5

Except that 80 wt % of PET staple fibers based on the total fiber weight and 20 wt % of LM PET staple fibers having a melting point of 160° C. based on the total fiber weight were mixed with each other to form a felt, it is the same as the manufacturing process of the physical specimen according to [Example 1].

EXAMPLE 6

Except that 75 wt % of PET staple fibers based on the total fiber weight and 25 wt % of LM PET staple fibers having a melting point of 160° C. based on the total fiber weight were mixed with each other to form a felt, it is the same as the manufacturing process of the physical specimen according to [Example 1].

COMPARATIVE EXAMPLE 1

Felt was formed by mixing 90 wt % of PET staple fibers having a melting point of 260° C. based on the total fiber weight and 10 wt % of LM PET staple fibers having a melting point of 110° C. based on the total fiber weight and the felt was subjected to the thermo-compression molding to produce physical specimens. Here, the PET staple fiber and the LM PET staple fiber each have a fiber having a 3d thickness.

COMPARATIVE EXAMPLE 2

Except that 85 wt % of PET staple fibers based on the total fiber weight and 15 wt % of LM PET staple fibers based on the total fiber weight were mixed with each other to form a felt, it is the same as the manufacturing process of the physical specimen according to [Comparative Example 1].

COMPARATIVE EXAMPLE 3

Except that 80 wt % of PET staple fibers based on the total fiber weight and 20 wt % of LM PET staple fibers based on the total fiber weight were mixed with each other to form a felt, it is the same as the manufacturing process of the physical specimen according to [Comparative Example 1].

COMPARATIVE EXAMPLE 4

Except that 75 wt % of PET staple fibers based on the total fiber weight and 25 wt % of LM PET staple fibers based on the total fiber weight were mixed with each other to form a felt, it is the same as the manufacturing process of the physical specimen according to [Comparative Example 1].

COMPARATIVE EXAMPLE 5

Except that 70 wt % of PET staple fibers based on the total fiber weight and 30 wt % of LM PET staple fibers based on the total fiber weight were mixed with each other to form a felt, it is the same as the manufacturing process of the physical specimen according to [Comparative Example 1].

COMPARATIVE EXAMPLE 6

Except that 90 wt % of PET staple fibers based on the total fiber weight and 10 wt % of LM PET staple fibers having a melting point of 150° C. based on the total fiber weight were mixed with each other to form a felt, it is the same as the manufacturing process of the physical specimen according to [Comparative Example 1].

COMPARATIVE EXAMPLE 7

Except that 70 wt % of PET staple fibers based on the total fiber weight and 30 wt % of LM PET staple fibers having a melting point of 150° C. based on the total fiber weight were mixed with each other to form a felt, it is the same as the manufacturing process of the physical specimen according to [Comparative Example 1].

COMPARATIVE EXAMPLE 8

Except that the felt was formed using PET staple fibers and LM PET staple fibers having a melting point of 160° C., it is the same as the manufacturing process of the physical specimen according to [Comparative Example 1].

COMPARATIVE EXAMPLE 9

Except that 70 wt % of PET staple fibers based on the total fiber weight and 30 wt % of LM PET staple fibers having a melting point of 160° C. based on the total fiber weight were mixed with each other to form a felt, it is the same as the manufacturing process of the physical specimen according to [Comparative Example 1].

The melting points and content ratios of the components of the physical specimen according to [Example 1] to [Example 6] and [Comparative Example 1] to [Comparative Example 9] are summarized in [Table 1] and [Table 2] below.

TABLE 1

| | Melting point of PET staple fibers (° C.) | Melting point of LM PET staple fibers (° C.) | Content ratio of the PET staple fibers (wt %) | Content ratio of the LM PET staple fibers (wt %) |
| --- | --- | --- | --- | --- |
| Example 1 | 260 | 130 | 85 | 15 |
| Example 2 | 260 | 130 | 80 | 20 |

TABLE 1-continued

|  | Melting point of PET staple fibers (° C.) | Melting point of LM PET staple fibers (° C.) | Content ratio of the PET staple fibers (wt %) | Content ratio of the LM PET staple fibers (wt %) |
|---|---|---|---|---|
| Example 3 | 260 | 130 | 75 | 25 |
| Example 4 | 260 | 160 | 85 | 15 |
| Example 5 | 260 | 160 | 80 | 20 |
| Example 6 | 260 | 160 | 75 | 25 |

TABLE 2

|  | Melting point of the PET staple fibers (° C.) | Melting point of LM PET staple fibers (° C.) | Content ratio of PET staple fibers (wt %) | Content ratio of LM PET staple fibers (wt %) |
|---|---|---|---|---|
| Comparative Example 1 | 260 | 110 | 90 | 10 |
| Comparative Example 2 | 260 | 110 | 85 | 15 |
| Comparative Example 3 | 260 | 110 | 80 | 20 |
| Comparative Example 4 | 260 | 110 | 75 | 25 |
| Comparative Example 5 | 260 | 110 | 70 | 30 |
| Comparative Example 6 | 260 | 150 | 90 | 10 |
| Comparative Example 7 | 260 | 150 | 70 | 30 |
| Comparative Example 8 | 260 | 160 | 90 | 10 |
| Comparative Example 9 | 260 | 160 | 70 | 30 |

The physical properties of the physical specimens according to [Example 1] to [Example 6] and [Comparative Example 1] to [Comparative Example 9] were evaluated by the following methods.

Sharpness of Emboss Pattern

The sharpness of the emboss pattern was visually determined in consideration of the emboss depth, surface fuzziness, and the like.

Wear Resistance

A test piece having a diameter of about 150 mm was taken and a hole having a diameter of about 6 mm was drilled at the center of the test piece. As such, the test piece was mounted on a TABER type abrasion tester specified by JIS L 1096 (general fabric test method), and the wear resistance was measured in accordance with the conditions of [Table 3]. The wear of the test piece surface after measurement is shown in Table 4.

TABLE 3

| Usage site | Condition | Types of wear wheels | load(N(gf)) | Number of times (times) |
|---|---|---|---|---|
| Sheet Trim type | Severe wear | CS-10 | 4.9(500) | 1000 |
|  | Less wear | CS-10 | 4.9(500) | 500 |

In Table 3, the load refers to the weight applied to one side, and the test was conducted by adding weight to both sides of the physical specimen.

TABLE 4

| grade | Degree of wear |
|---|---|
| 5 | No signs of wear were observed |
| 4 | The surface is slightly linty or there is evidence of wear |
| 3 | Lint is noticeable on the wear part, or the surface is lint-free and the inside is free of lint |
| 2 | There is thread breakage in the wear part, and lint is severe. |
| 1 | The back side is seen because the wear of the surface is severe |

Flexibility

Figure 7:
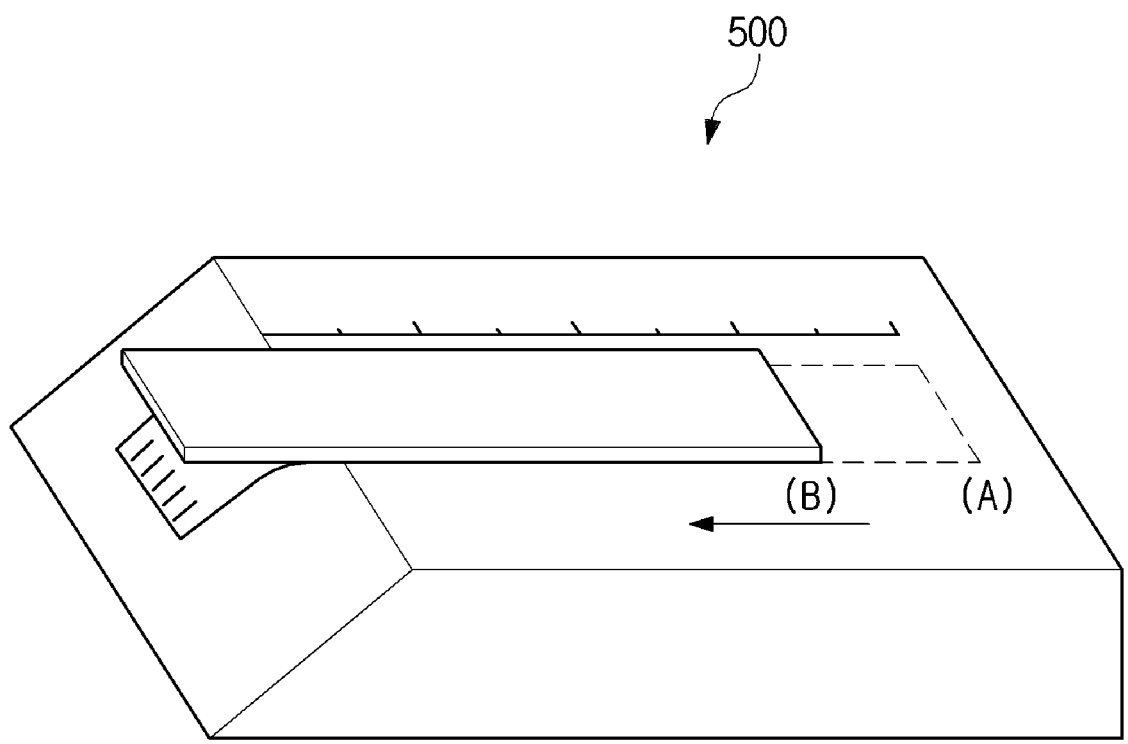
FIG. 7 is a view showing an apparatus for measuring flexibility.

FIG. 7 is a view showing an apparatus for measuring flexibility. For flexibility measurement, five test pieces of 25 mm width and 200 mm length were taken. Thereafter, as shown in FIG. 7, the test piece was put on a horizontal track with a smooth surface having a slope of 45 degrees at one end, and the test piece was pressed with a presser plate having the same size as the test piece so that the test piece was moved at a speed of about 10 mm/sec in the direction of the slope. The firmness is indicated by the moving distance scale (point B scale) (mm) of the push plate when one end of the test piece touches the slope, and is expressed as the average value of the measured values for five test pieces.

Heat Resistance

The process of exposing the test piece to a condition of −110° C. for 2 hours, a condition of −40° C. for 2 hours, and a room temperature for 2 hours is repeated for 3 cycles. After the test, the test piece is evaluated for appearance abnormality including wrinkles.

Deflection State

After fabricating the cargo screen with the test pieces according to [Example 1] to [Example 6] and [Comparative Example 1] to [Comparative Example 9], the degree of deflection of the fabric at both end portions of the cargo screen was measured with respect to the horizontal line of the fabric.

The results of the physical property measurement of the test pieces measured in the above manner are shown in [Table 5] to [Table 10] below. In [Table 5] to [Table 10], the results were shown to be very excellent (⊚), excellent (○), normal (Δ), and poor (×) according to the order of superiority of physical properties.

First, in [Table 5] to [Table 7], the results of the physical properties of the test piece according to the weight ratio of LM PET staple fibers based on the melting point of LM PET staple fibers are shown.

TABLE 5

| Mixing LM PET having a melting point 110° C. | | | | | |
|---|---|---|---|---|---|
| Weight ratio of LM PET | Sharpness of emboss pattern | Wear resistance | Flex-ibility | Heat resistance | Deflection state |
| Comparative Example 1 (10 wt %) | ○ | ○ (grade 4) | ○ | Δ | Δ |
| Comparative Example 2 (15 wt %) | ⊚ | ⊚ (grade 5) | ○ | X | ○ |
| Comparative Example 3 (20 wt %) | ⊚ | ⊚ (grade 5) | Δ | X | ⊚ |
| Comparative Example 4 (25 wt %) | ⊚ | ⊚ (grade 5) | X | X | ⊚ |
| Comparative Example 5 (30 wt %) | ⊚ | ⊚ (grade 5) | X | X | ⊚ |

TABLE 6

Mixing LM PET having a melting point 130° C.

| Weight ratio of LM PET | Sharpness of emboss pattern | Wear resistance | Flex-ibility | Heat resistance | Deflection state |
|---|---|---|---|---|---|
| Comparative Example 6 (10 wt %) | Δ | Δ(grade 3) | ◎ | ◎ | Δ |
| Example 1 (15 wt %) | ○ | ○(grade 4) | ○ | ○ | ○ |
| Example 2 (20 wt %) | ◎ | ◎(grade 5) | ○ | ○ | ○ |
| Example 3 (25 wt %) | ◎ | ◎(grade 5) | Δ | Δ | ◎ |
| Comparative Example 7 (30 wt %) | ◎ | ◎(grade 5) | X | X | ◎ |

TABLE 7

Mixing LM PET having a melting point 160° C.

| Weight ratio of LM PET | Sharpness of emboss pattern | Wear resistance | Flex-ibility | Heat resistance | Deflection state |
|---|---|---|---|---|---|
| Comparative Example 8 (10 wt %) | Δ | X(grade 2) | ◎ | ◎ | Δ |
| Example 4 (15 wt %) | ○ | Δ(grade 3) | ◎ | ◎ | ○ |
| Example 5 (20 wt %) | ◎ | ○(grade 4) | ○ | ◎ | ○ |
| Example 6 (25 wt %) | ◎ | ◎(grade 5) | ○ | ○ | ○ |
| Comparative Example 9 (30 wt %) | ◎ | ◎(grade 5) | Δ | Δ | ◎ |

In the evaluation of physical property test, when the wear resistance condition of the test pieces meets the condition of grade 3, the test piece is evaluated as suitable for use as a vehicle internal material. In addition, when the heat resistance condition of the test pieces meets the condition of very excellent (◎) as the most important physical condition, the test piece is evaluated as suitable for use as a vehicle internal material.

Referring to [Table 5], it was confirmed that when LM PET staple fibers having a melting point of 110° C. were used, the heat resistance was deteriorated irrespective of the weight ratio of LM PET. In addition, as in the case of [Comparative Example 4] and [Comparative Example 5], it was confirmed that flexibility was also lowered when the weight ratio of the LM PET staple fibers was increased.

Referring to [Table 6], when LM PET staple fibers having a melting point of 130° C. were used, the sharpness of the emboss pattern formed on the non-woven fabric decreased and deflection phenomenon occurred when LM PET staple fibers were added in an amount of 10% by weight as shown in [Comparative Example 6]. On the contrary, when LM PET staple fibers were added in an amount of 30 wt % as shown in [Comparative Example 7], the flexibility and heat resistance of the non-woven fabric were deteriorated. Meanwhile, when the LM PET staple fibers were added in an amount of 15 wt %, 20 wt % and 25 wt % respectively as shown in [Example 1] to [Example 3], it was confirmed that the non-woven fabric having excellent physical properties may be provided.

Referring to [Table 7], when the LM PET staple fibers having a melting point of 160° C. were used, the sharpness of the emboss pattern formed on the non-woven fabric decreased and deflection phenomenon occurred when LM PET staple fibers were added in an amount of 10 wt % as shown in [Comparative Example 8]. In contrast, when the LM PET staple fibers were added in an amount of 30 wt % each as in [Comparative Example 9], it was confirmed that the flexibility and heat resistance of the non-woven fabric were relatively decreased as compared with [Example 4] to [Example 6]. On the other hand, when LM PET staple fibers were added in an amount of 15 wt %, 20 wt %, and 25 wt %, respectively, as in [Example 4] to [Example 6], it was confirmed that a non-woven fabric having excellent physical properties may be provided.

In the following Tables 8 to Tables 10, the results of physical properties of the Example and Comparative Example shown in [Table 5] to [Table 7] were compared with those of the LM PET staple fiber melting point based on the weight ratio of the LM PET staple fibers and the description of the properties of the test results of the same parts shown in the test results of [Table 5] to [Table 7] will be omitted.

TABLE 8

15 wt % of LM PET

| Melting point of LM PET | Sharpness of emboss pattern | Wear resistance | Flex-ibility | Heat resistance | Deflection state |
|---|---|---|---|---|---|
| Comparative Example 2 (110° C.) | Δ | ◎(grade 5) | ○ | X | ○ |
| Example 1 (130° C.) | ◎ | ○(grade 4) | ○ | ○ | ○ |
| Example 4 (160° C.) | ○ | Δ(grade 3) | ◎ | ◎ | ○ |

TABLE 9

20 wt % of LM PET

| Melting point of LM PET | Sharpness of emboss pattern | Wear resistance | Flex-ibility | Heat resistance | Deflection state |
|---|---|---|---|---|---|
| Comparative Example 3 (110° C.) | ◎ | ◎(grade 5) | Δ | X | ◎ |
| Example 2 (130° C.) | ◎ | ◎(grade 5) | ○ | ○ | ○ |
| Example 5 (160° C.) | ○ | ○(grade 4) | ○ | ◎ | ○ |

TABLE 10

30 wt % of LM PET

| Melting point of LM PET | Sharpness of emboss pattern | Wear resistance | Flex-ibility | Heat resistance | Deflection state |
|---|---|---|---|---|---|
| Comparative Example 5 (110° C.) | ◎ | ◎(grade 5) | X | X | ◎ |
| Comparative Example 7 (130° C.) | ◎ | ◎(grade 5) | X | X | ◎ |
| Comparative Example 9 (160° C.) | ◎ | ◎(grade 5) | Δ | Δ | ○ |

As a result of the experiment, it was found that a non-woven fabric for vehicle internal materials having excellent physical properties may be realized when the felt is formed by mixing the LM PET staple fibers having the melting points in the range of 120 to 140 and 150 to 170° C. with the PET staple fibers, in when a felt is formed by mixing 15 to 25 wt % of LM PET staple fibers based on the total fiber weight, with 75 to 85 wt % of PET staple fibers based on the total fiber weight.

The nonwoven fabric completed through the method of manufacturing the nonwoven fabric for vehicle internal materials as described above has excellent physical properties and can contribute to weight reduction as a vehicle internal material. The nonwoven fabric according to an exemplary embodiment of the present invention has improved embossed pattern sharpness, wear resistance, flexibility, heat resistance, antistatic function, flame retardancy, antifouling function, and the function of suppressing the formation of volatile organic compounds (VOCs), and thus the nonwoven fabric may be usefully applied as a vehicle internal material.

In addition, by use of the heating roller and the rubber roller in the embossing step, the thickness variation of the felt itself may be made smooth, and the appearance of shine may be prevented. Further, since an irregular emboss pattern is formed on one surface of the non-woven fabric, the appearance quality may be enhanced.

As is apparent from the above description, according to the provided, non-woven fabric for vehicle internal material, a manufacturing method of the non-woven fabric, and a cargo screen using the non-woven fabric for vehicle internal material, it may be possible to realize a three-dimensional and luxurious appearance while satisfying the level required as the vehicle internal material, regarding with the physical properties such as, wear resistance, flexibility, heat resistance, flame retardancy, antistatic function, antifouling function, and suppression of formation of volatile organic compounds (VOCs).

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo screen for a vehicle including:
   a housing having first and second end portions supported by the vehicle body and having a slit hole formed at one side of the housing;
   a winding roller rotatably provided in the housing and elastically supported to rotate in a direction opposite to the slit hole; and
   a non-woven fabric wound around the winding roller to be drawn out to an outside thereof by an external force,
   wherein the non-woven fabric is manufactured by thermo-compression molding of a felt formed by mixing polyethylene terephthalate (PET) staple fibers and LM PET (Low melting polyethylene terephthalate) staple fibers having a melting point in the range of 120 to 140° C. or 150 to 170° C.,
   wherein the PET staple fibers and the LM PET staple fibers have a thickness in the range of 1 to 6 denier,
   wherein the non-woven fabric has a binder coating layer formed of a phosphorous flame retardant and an acrylic binder on one side of the non-woven fabric, and
   wherein the non-woven fabric is formed by mixing the LM PET staple fibers in an amount of 15 or more and less than 20 wt % based on a total fiber weight and PET staple fibers in an amount of more than 80 and 85 wt % or less based on a total fiber weight.

2. The cargo screen for the vehicle according to claim 1, wherein the non-woven fabric has an emboss pattern on one side of the non-woven fabric.

3. The cargo screen for the vehicle according to claim 1, wherein the non-woven fabric has a printing layer formed of an acrylic polymer on one side of the non-woven fabric.

* * * * *